March 20, 1928. 1,663,344
T. C. LENNARD
ENDLESS BELT CONVEYER
Filed July 2, 1927
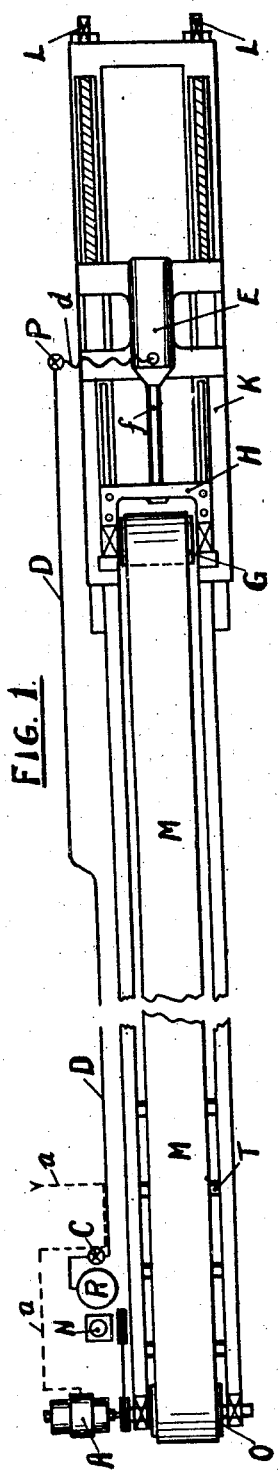
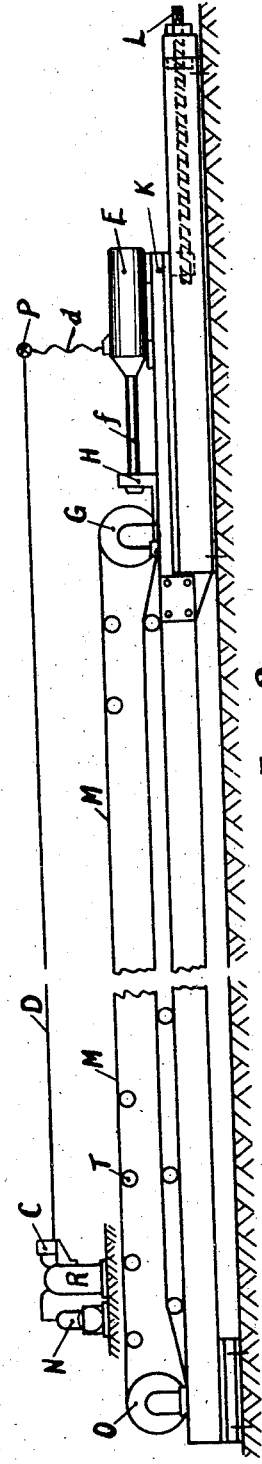
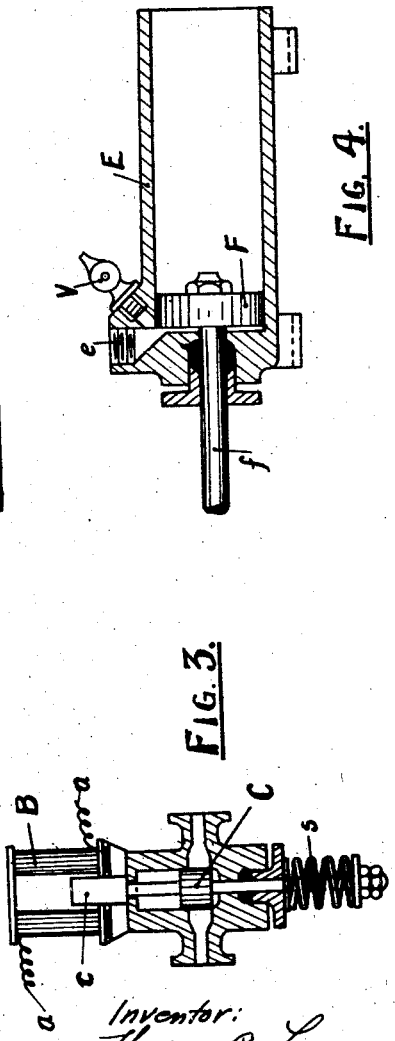
Inventor:
Thomas C. Lennard
by Hedlund & Frucht
his Attorneys Patented Mar. 20, 1928.

1,663,344

UNITED STATES PATENT OFFICE.

THOMAS CAYGILL LENNARD, OF GLASGOW, SCOTLAND.

ENDLESS BELT CONVEYER.

Application filed July 2, 1927, Serial No. 203,134, and in Great Britain May 21, 1926.

This invention relates to improved tensioning means for endless belt conveyers or elevators and has primarily for its object to enable the tension on the belt to be varied in relation to the load, so that the tension is automatically or mechanically reduced when the load is low and increased as the load increases.

At present it is usual to allow for stretch and normal loading of the belt by applying initial tension to the belt by means of screw or ratchet mechanism, or by the use of weights. In such cases, the tension when once adjusted remains constant.

My invention may be employed either alone or in conjunction with the usual initial tensioning means.

According to the present invention, I provide an adjustable or slidable belt-tensioning device connected to an auxiliary reciprocatory compressed-air or other fluid pressure engine, means being provided for either maintaining constant pressure in the engine or adjusting the pressure to vary the position of the belt-tensioning device. The pressure may be controlled by fluctuations in the load on the belt drive, so as to automatically increase the tension on the belt as the load increases and vice-versa.

My invention is more particularly applicable to endless belt conveyers for colliery workings, for which purpose compressed-air is used as the pressure fluid for driving the auxiliary engine. To this end, an air compressor may be driven from the usual head or tail pulley or driving motor of the conveyer or the supply may be taken from an independently driven compressor, the compressor being connected to the cylinder of the auxiliary engine through a receiver and control valve.

The accompanying drawing illustrates one example of my invention in its application to an electrically-driven endless belt conveyer, Figs. 1 and 2 being diagrammatic views showing the conveyer and belt tensioning mechanism in plan and elevation respectively. Fig. 3 is a detail sectional elevation of the valve and Fig. 4 a vertical sectional view through the auxiliary engine.

In the example illustrated, the main current supply $a$ to the driving motor A of the conveyer is in series with an electro-magnet or other electrical device B controlling a valve C in a pressure-fluid supply pipe D leading to the cylinder E of an auxiliary engine, the belt tensioning device being adjusted by the auxiliary engine, that is to say, being connected to the piston F of the auxiliary engine, the cylinder whereof is fixed.

The pressure fluid may be compressed air generated by an air compressor N which may be driven either from the head pulley O (as shown) or from the driving motor A or tail pulley G. The compressor N is shown connected to the control valve C through a receiver R.

The stem $c$ of the control valve C is controlled by the electro-magnet B in series with the main current supply $a$ to the driving motor A of the conveyer. The piston rod $f$ of the piston F of the auxiliary engine may be coupled to the tail pulley or adjustable roller G of the conveyer, the tail pulley or adjustable roller G being mounted upon a slide H to which the piston of the auxiliary engine is fixed. The slide H is mounted upon a main slide bed K upon which the cylinder E is fixed and which is operated by screws L or other mechanism to enable the initial tension on the belt M to be adjusted as desired.

The stem $c$ of the control valve C preferably forms the movable core of the coil of the electro-magnet B and the mechanism is so arranged that, when the conveyer is empty and little current is being used to drive the conveyer, the electro-magnet B allows the control valve C to close (the valve being preferably closed by a spring $s$ acting against the pull of the electro-magnet B). The supply of the compressed-air to the auxiliary engine is thus cut-off. When the load on the conveyer increases, the current used will also increase and thus increase the excitation of the electro-magnet B until it opens the valve C and admits compressed-air to the auxiliary engine E, whereupon the piston F of the auxiliary engine will be driven outwards, thereby increasing the tension on the belt M, by drawing the tail pulley G along its slide bed K.

The cylinder E of the auxiliary engine is preferably fitted with an adjustable relief cock or vent V which will allow the air in the cylinder to escape at a predetermined rate.

When the load on the conveyer decreases, the electro-magnet B will allow the control valve C to reduce or cut-off the air supply to the auxiliary engine E and the pressure in the cylinder will thus be reduced, thereby releasing the tension on the belt M.

When the belt is loaded, the compressed-air in the cylinder E forms a cushion and serves to absorb heavy shocks due to sudden increases in the load, as for example, when large pieces of material fall on to the belt. The belt is thus enabled to accommodate itself readily to the varying load conditions.

P designates a manually-actuated valve which may be fitted in the pressure pipe D.

T designates the idler rollers (some only of which are shown) for supporting the belt M.

It will be understood that the pressure pipe connection from the control valve C to the cylinder E of the auxiliary engine must be flexible or otherwise designed to allow of adjustment of the auxiliary engine when adjusting the initial tension on the belt. In the example shown, a flexible pipe d connects the valve D to the inlet connection e of the cylinder E.

My invention can also be applied to any number of conveyers, one common compressor supplying a group of receivers, each connected to its own control valve, and each valve being connected to its own auxiliary engine for adjusting the tension of the corresponding conveyer.

My invention may also be employed without the provision of an automatically-controlled valve C. In this event, the compressor N may be adapted to maintain a constant pressure in the engine cylinder E and the pressure in the cylinder E may be adjusted by the provision of a manually-controlled valve, such as the valve P.

I claim:

1. In electrically-driven endless belt conveyers, a belt tensioning device, a fluid-pressure engine connected thereto, a pressure fluid supply pipe connected to the engine, a valve controlling the pressure fluid supply, and means controlling said valve and actuated by fluctuations in the current supply to the driving motor of the conveyer.

2. Tensioning means for endless belt conveyers comprising a reciprocatory fluid pressure piston engine, a piston therein connected to the tail pulley of the conveyer, a bed upon which said engine and said tail pulley are mounted, said pulley being movable on said bed in response to movement of said piston, and means for initially adjusting said bed, to initially tension the belt.

3. Improved tensioning means for endless belt conveyers or elevators comprising an adjustable belt tensioning device, a reciprocatory fluid-pressure engine connected thereto, and means responsive to fluctuations in the load on the belt drive for adjusting the fluid pressure to vary the position of the belt tensioning device.

4. Improved tensioning means for endless belt conveyers or elevators comprising an adjustable belt tensioning device, a reciprocatory fluid-pressure engine connected thereto, a relief vent in said engine adjustable to allow escape of pressure fluid at a predetermined rate, and means responsive to fluctuations in the load on the belt drive for adjusting the fluid pressure to vary the position of the belt tensioning device.

The foregoing specification signed at Glasgow, Scotland, this 14th day of June, 1927.

THOMAS CAYGILL LENNARD.